United States Patent
Musat (10) Patent No.: US 6,202,779 B1
(45) Date of Patent: Mar. 20, 2001

(54) CRUISE CONTROL SYSTEM

(75) Inventor: Carl Musat, Sheffield Lake, OH (US)

(73) Assignee: MTO Products Inc., Cleveland, OH (US)

( * ) Notice: Subject to any disclaimer, the term of this patent is extended or adjusted under 35 U.S.C. 154(b) by 0 days.

(21) Appl. No.: 09/326,242

(22) Filed: Jun. 4, 1999

Related U.S. Application Data (60) Provisional application No. 60/088,315, filed on Jun. 5, 1998.

(51) Int. Cl.$^7$ .................................................. B60K 31/00
(52) U.S. Cl. .......................... 180/170; 180/315; 180/336; 180/900; 74/512; 74/526
(58) Field of Search .................................... 180/170, 900, 180/315, 336; 74/512, 526

(56) References Cited

U.S. PATENT DOCUMENTS

| | | | |
|---|---|---|---|
| 3,635,101 | * | 1/1972 | Hsian ................................. 74/526 |
| 3,768,340 | * | 10/1973 | Heintz ................................ 477/121 |
| 3,837,235 | | 9/1974 | Peterson ............................ 74/531 |
| 4,002,085 | * | 1/1977 | Johnston ............................ 74/513 |
| 4,159,753 | * | 7/1979 | Boche ................................. 180/170 |
| 4,759,417 | | 7/1988 | Wanie et al. ..................... 180/6.34 |
| 4,771,856 | * | 9/1988 | Hutchison et al. .............. 180/333 |
| 4,776,420 | * | 10/1988 | Seibert et al. .................... 180/178 |
| 5,022,477 | * | 6/1991 | Wanie ................................ 180/6.34 |
| 5,054,570 | * | 10/1991 | Naito et al. ....................... 180/170 |
| 5,083,542 | * | 1/1992 | Kishimoto ........................ 123/400 |
| 5,168,970 | * | 12/1992 | Hough et al. .................... 192/222 |
| 5,209,314 | * | 5/1993 | Nishiyama ........................ 180/68.6 |
| 5,211,070 | | 5/1993 | Hirata et al. ..................... 74/477 |
| 5,228,360 | * | 7/1993 | Johnson ............................. 74/512 |
| 5,367,864 | * | 11/1994 | Ogasawara et al. ............. 56/15.8 |
| 5,511,631 | * | 4/1996 | Tsuchihashi et al. ............ 180/247 |
| 5,934,400 | * | 8/1999 | Larsen et al. .................... 180/170 |
| 6,070,690 | * | 6/2000 | Eavenson et al. ................ 180/315 |

FOREIGN PATENT DOCUMENTS 2180018  3/1987 (GB) ............................................ 9/12

OTHER PUBLICATIONS

International Search Report Mailed Jul. 10, 1999.

* cited by examiner

*Primary Examiner*—Brian L. Johnson
*Assistant Examiner*—Deanna Draper
(74) *Attorney, Agent, or Firm*—Emerson & Skeriotis; Roger D. Emerson; Timothy D. Bennett (57) ABSTRACT

A mower having a cruise control system is provided. The mower includes a frame, a plurality of wheels including at least a first drive wheel operatively supported by the frame, an engine operatively mounted to the frame, a mower deck operatively connected to the frame, and a drive system for use in transferring power from the engine to the at least first drive wheel. The drive system includes an accelerator pedal fixedly connected to an accelerator rod. The cruise control system mechanically locks the accelerator pedal and accelerator rod in place. This permits the operator to release all pressure from the accelerator pedal (resting the foot of the operator) while maintaining the accelerator pedal in any predetermined position. Preferably, the cruise control system includes a rack member fixedly attached to the accelerator rod and having rack teeth, a cruise cam pivotably attached to the frame and having cruise teeth, a cruise lever that is selectively adjustable by an associated operator, and an extension arm pivotably connected to the cruise lever and a having an end pivotably connected to the cruise cam. To engage this cruise control system the following steps are required. First, the operator depresses the accelerator pedal corresponding to the desired speed. Next, the cruise lever is pushed. This causes the extension arm to move resulting in the pivoting motion of the cruise cam. As the cruise cam moves, the cruise teeth are engaged with the rack teeth.

7 Claims, 5 Drawing Sheets

CRUISE CONTROL SYSTEM

This Utility Patent Application claims priority from Provisional Patent Application Ser. No. 60/088,315 filed Jun. 5, 1998.

BACKGROUND OF THE INVENTION

1. Field of Invention

This invention pertains to the art of methods and apparatuses for driving vehicles, and more specifically to methods and apparatuses for a cruise control system for a lawn care device.

2. Description of the Related Art

In the art of lawn care devices, such as a mower, it is well known that when a relatively large amount of ground is being mowed or the lawn care device is being driven for a relatively long time, the operator may become fatigued. When a riding lawn care device is used, this fatigue is due primarily to the continual pressure the operator must exert on the various controls, such as an acceleration pedal. Thus, there is a need for a method to reduce this fatigue in operators of lawn care devices.

The present invention provides methods and apparatuses for a cruise control system for a mower that is easy and intuitive to operate. The difficulties inherent in the art are therefore overcome in a way that is simple and efficient while providing better and more advantageous results.

SUMMARY OF THE INVENTION

According to one aspect of this invention, a mower is provided. The mower includes a frame, a plurality of wheels including at least a first drive wheel operatively supported by the frame, an engine operatively mounted to the frame, a mower deck operatively connected to the frame, and a drive system for use in transferring power from the engine to the at least first drive wheel. The drive system includes an accelerator pedal fixedly connected to an accelerator rod. The mower also includes a cruise control system that mechanically locks the accelerator pedal and accelerator rod in place. This permits the operator to release all pressure from the accelerator pedal (resting the foot of the operator) while maintaining the accelerator pedal in any predetermined position. In this way the mower maintains substantially the same speed without constant input from the operator.

According to another aspect of this invention, the cruise control system also includes a rack member fixedly attached to the accelerator rod and having rack teeth, a cruise cam pivotably attached to the frame and having cruise teeth, a cruise lever that is selectively adjustable by an associated operator, and an extension arm pivotably connected to the cruise lever and a having an end pivotably connected to the cruise cam. To engage this cruise control system the following steps are required. First, the operator depresses the accelerator pedal corresponding to the desired speed. Next, the cruise lever is pushed. This causes the extension arm to move resulting in the pivoting motion of the cruise cam. As the cruise cam moves, the cruise teeth are engaged with the rack teeth.

One advantage of the present invention is that an operator's fatigue may be reduced.

Another advantage of this invention is that a constant speed can be maintained by an operator while driving a lawn care device.

Still another advantage of this invention is that it is easy to operate.

Another advantage of this invention is that it is easy to manufacture and can be made economically.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

DESCRIPTION OF THE PREFERRED EMBODIMENT

Figure 1:
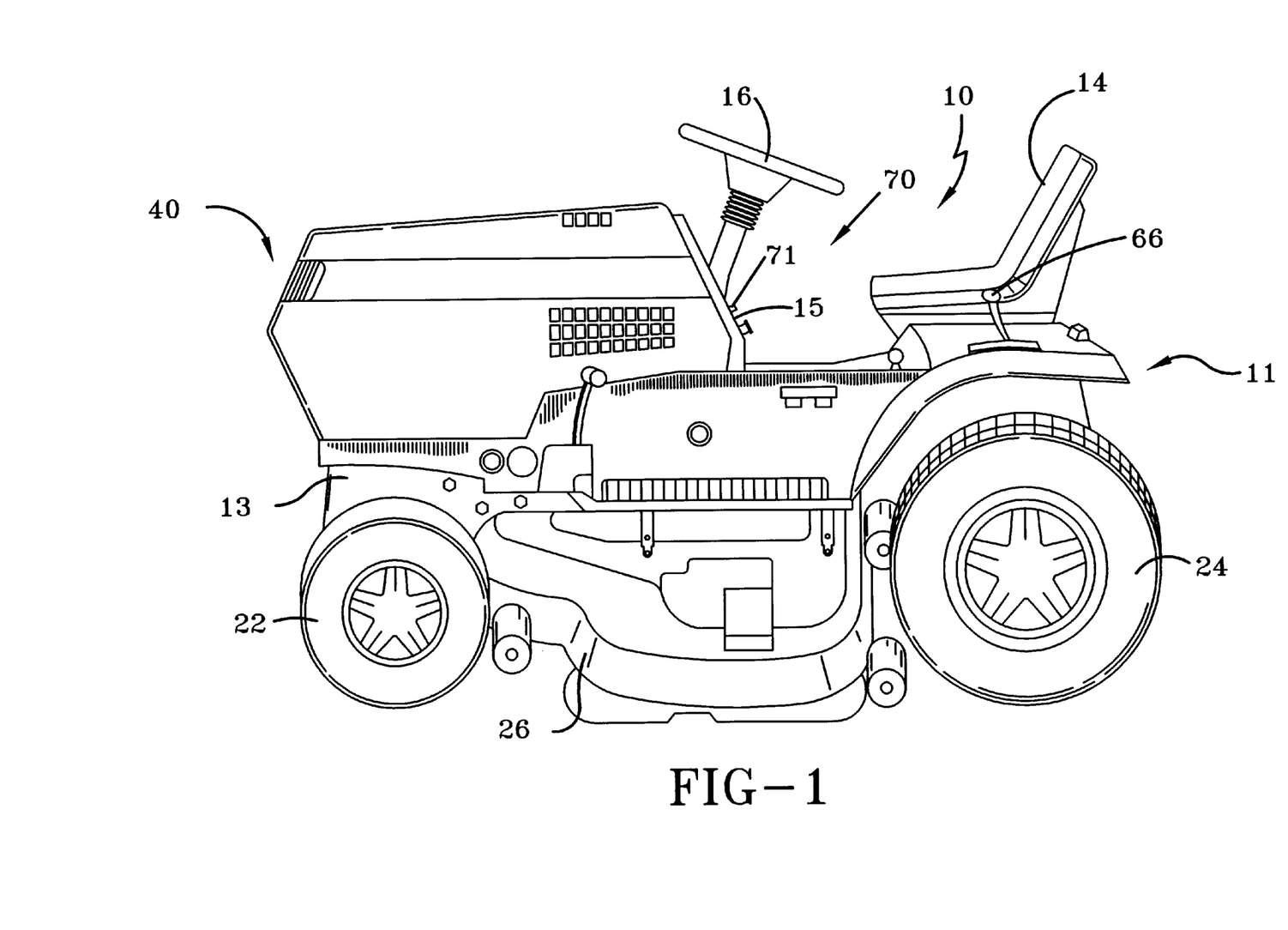
FIG. 1 is a side elevation view of a riding mower equipped with the cruise control system of the present invention.

Referring now to the drawings wherein the showings are for purposes of illustrating a preferred embodiment of the invention only and not for purposes of limiting the same, FIG. 1 shows a mower 10 which is equipped with a cruise control system 70 in accordance with this invention. This preferred embodiment is directed to a riding lawn mower but the invention is applicable to other vehicles, other lawn care devices, and other applications as well. The mower 10 includes a frame 13, a dash 15 mounted to the frame 13, an operator seat 14 and a steering implement 16 for steering front wheels 22. An engine 40 is used to provide power to a dynamic drive and brake system 11 and to rotate one or more cutting blades (not shown) within a mower deck 26. The operation of the cutting blades is well known in the art and thus will not be discussed further in this specification. The dynamic drive and brake system 11 is used to drive back wheels 24 as will be discussed further below. It should be noted that this invention is equally applicable to a mower using the front wheels as the drive wheels.

Figure 2:
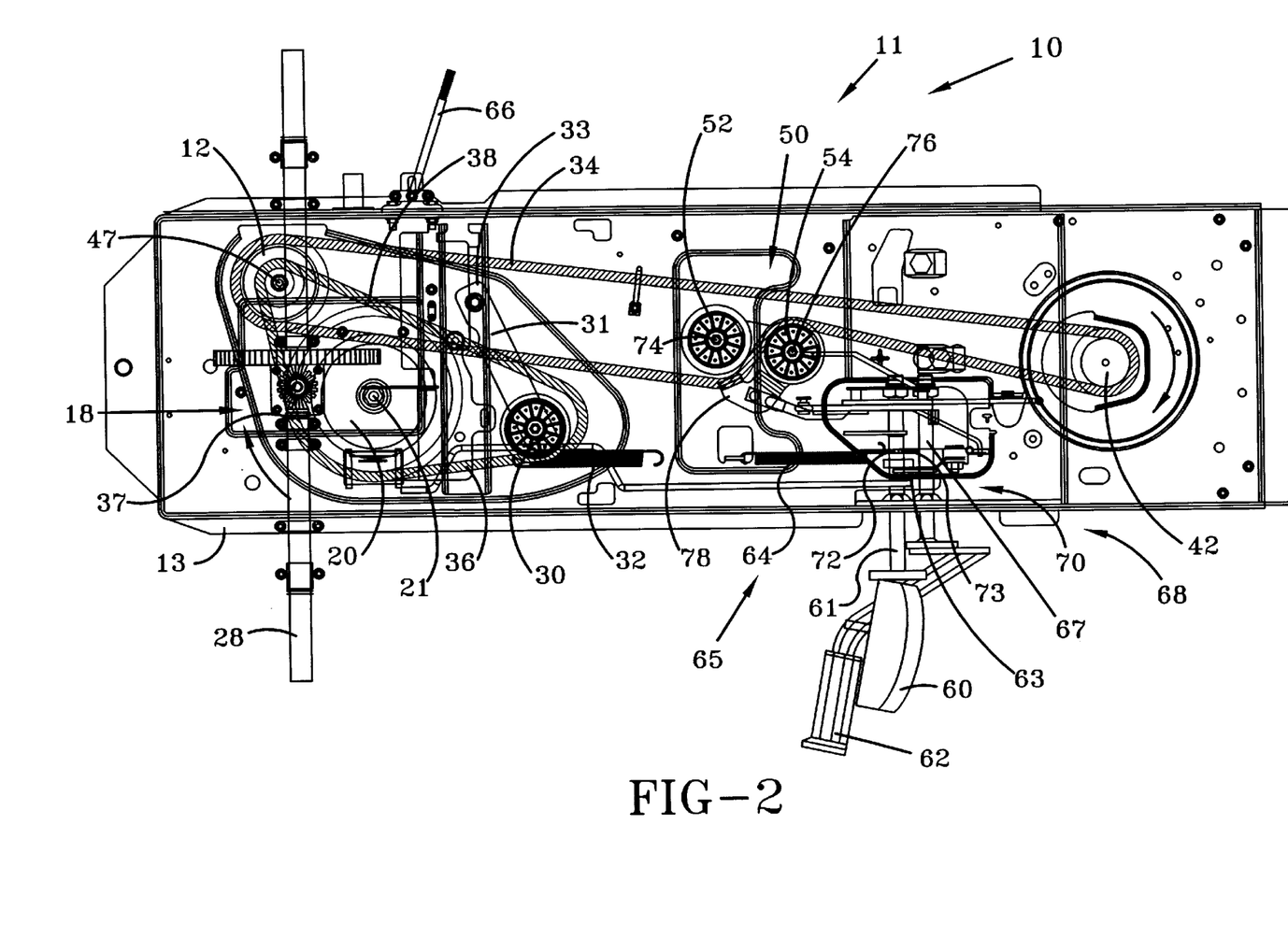
FIG. 2 is a simplified cut-a-way plan view of the riding mower of FIG. 1 showing the first and second belts of the dynamic drive and brake system positioned for low speed operation.

With reference now to FIGS. 1–2, although the cruise control system 70 of this invention can be used with any drive system chosen with sound engineering judgement, the preferred dynamic drive and brake system 11 will now be described. The dynamic drive and brake system 11 of this invention includes an engine drive pulley 42 that is rotatably connected to the engine 40 in any manner commonly known in the art. A first belt 34 operatively connects the engine drive pulley to a double pulley 12 for selective rotation of the double pulley 12. An engaging means 65 is provided for use to selectively loosen and tighten the first. belt 34. Although the engaging means 65 may be of any type chosen with sound engineering judgment, in the preferred embodiment the engaging means 65 includes a double idler pulley system 50, having first and second double idler pulleys 52, 54. This will be discussed further below. A second belt 36 operatively connects the double pulley 12 to a transmission input pulley 20 for selective rotation of the transmission input pulley 20. The transmission input pulley 20 is fixedly connected to a driven pulley shaft 21 that is operatively connected to a transmission 18. The transmission 18 is operatively connected to a back drive axle 28 for selective rotation of the back wheels 24 that are operatively connected to the back drive axle 28. The transmission 18 may be of any type chosen with sound engineering judgement that receives input from a rotating shaft such as driven pulley shaft 21. It should be noted that the dynamic drive and brake system 11 of this invention is applicable to any type of driven pulley such as the transmission input pulley 20 shown in this preferred embodiment. In the preferred embodiment, the axis of the driven pulley shaft 21 is fixed with respect to the frame 13. In other words, the transmission input pulley 20 and the driven pulley shaft 21 are rotatable with respect to the frame 13 but the pulley 20 and shaft 21 do not move relative to the frame 13 in any other way. An idler pulley 30 is used to selectively loosen and tighten the second belt 36 as will be discussed further below.

Figure 4:
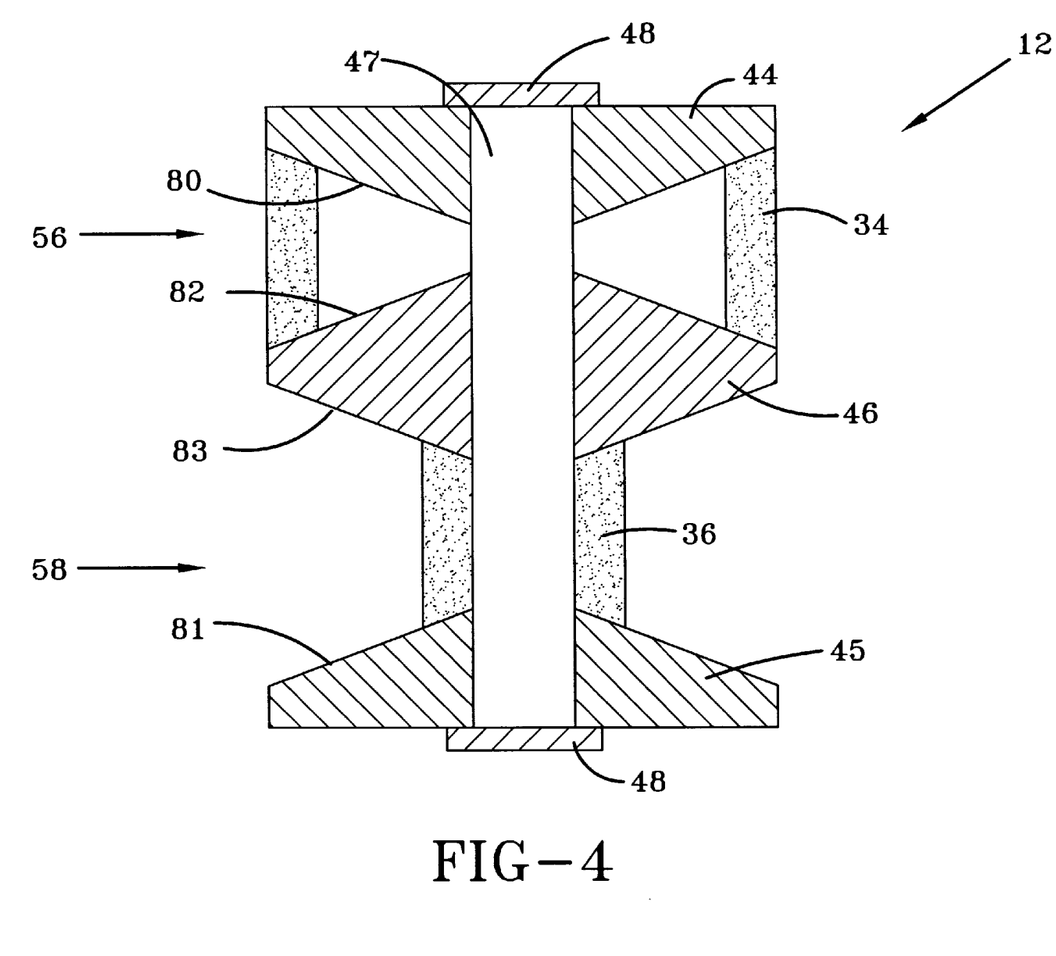
FIG. 4 is a cross-sectional view of the double pulley showing the first and second pulley portions.

With reference now to FIGS. 2 and 4, the double pulley 12, also referred to as a variable speed pulley, includes first and second end pulley members 44, 45 rotatably connected to the ends of a double pulley shaft 47. The double pulley shaft is rotatable within a pair of bearings 48. A middle pulley member 46 is rotatably and slidably connected to the double pulley shaft 47. By slidably connected it is meant that the middle pulley member 46 is slidable along the axis of the double pulley shaft 47. As shown in FIG. 4, the first and second end pulley members 44, 45 have angled surfaces 80, 81 respectively for operative contact with the first and second belts 34, 36 respectively. The middle pulley member 46 similarly has first and second angled surfaces 82, 83 for operative contact with the first and second belts 34, 36 respectively. In this way, the angled surface 80 of the first end pulley member 44 and the first angle surface 82 of the middle pulley member 46 form a first pulley portion 56 for receiving the first belt 34. Similarly, the angled surface 81 of the second end pulley member 45 and the second angled surface 83 of the middle pulley member 46 form a second pulley portion 58 for receiving the second belt 36.

With reference to FIG. 4, the angled surfaces 80, 81, 82, 83 permit the first and second pulley portions 56, 58 to provide varying diameters for the first and second belts 34, 36 about the double pulley shaft 47. This will be discussed further below. It should be noted, however, that the angled surfaces 80, 81, 82, 83 permit, depending on the position of the middle pulley member 46, the first and second belts 34, 36 to be positioned with the smallest possible inner diameter equal to the outside diameter of the double pulley shaft 47. This is the condition of the second belt 36 shown in FIG. 4. This provides for maximum speed variation (diameter ratios are maximum) for a given size of double pulley 12.

Figure 3:
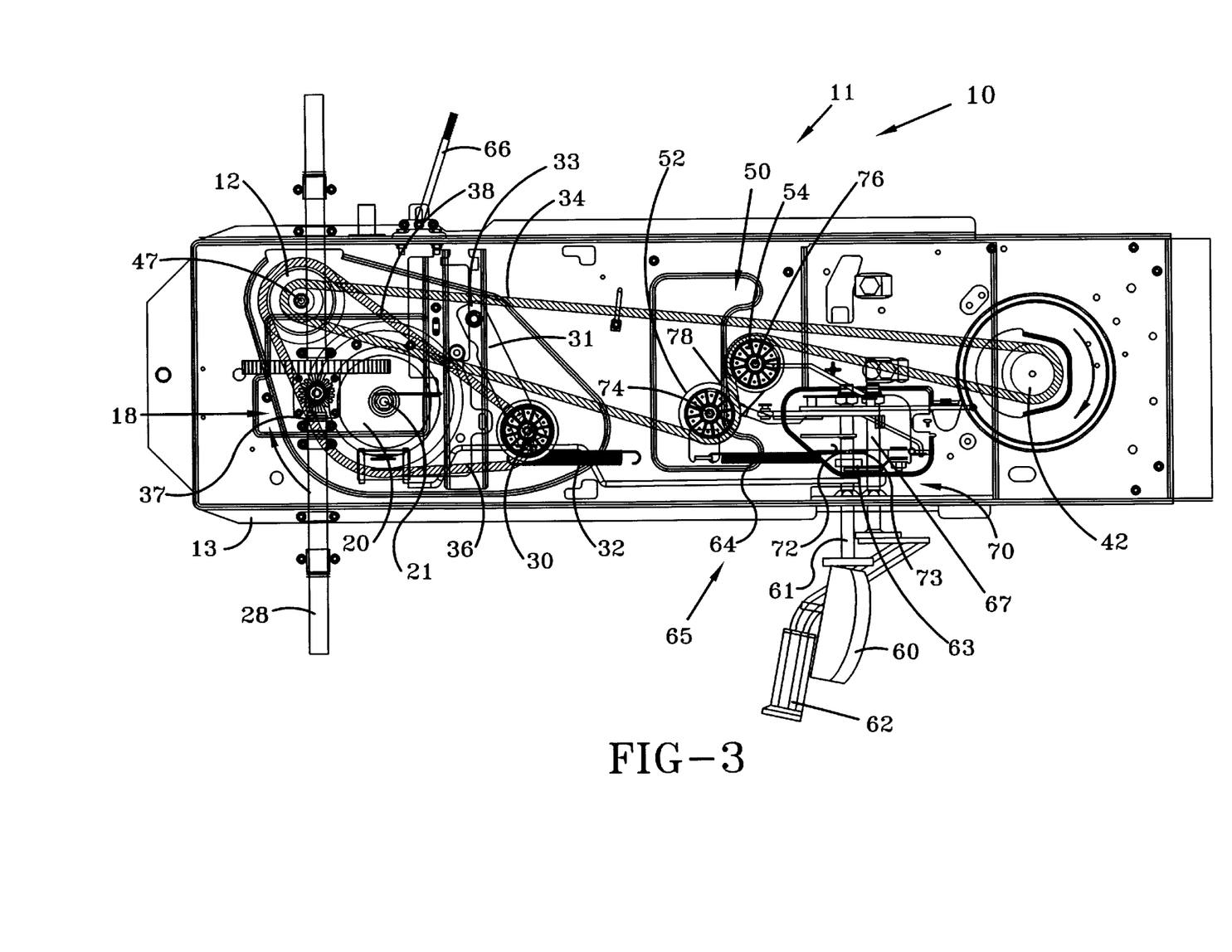
FIG. 3 is a simplified cut-a-way plan view similar to FIG. 2 except showing the first and second belts of the dynamic drive and brake system positioned for high speed operation.

With reference now to FIGS. 2–4, in the preferred embodiment, the axis of the double pulley shaft 47 is fixed with respect to the frame 13. In other words, the first and second end pulley members 44, 45 and the double pulley shaft 47 are rotatable with respect to the frame 13 but the pulley members 44, 45 and shaft 47 do not move relative to the frame 13 in any other way. This can be visualized by comparing FIG. 2 to FIG. 3. In both Figures, the double pulley 12 is positioned identically with respect to the frame 13 even though FIG. 2 shows a low speed condition and FIG. 3 shows a high speed condition. It is known in the art to use a double pulley that is movably mounted with respect to the frame 13. Since the axis of the double pulley 12 of this invention is fixedly mounted with respect to the frame 13, a method is required to "take-up" any loose belt as the diameters of the first and second belts 34, 36 are varied at the double pulley 12. The loose belts are taken-up by the idler pulley 30 as will be described below.

With continuing reference to FIGS. 2–4, when the middle pulley member 46 slides upward along the double pulley shaft 47, as shown in FIG. 4, the first pulley portion 56 forces the first belt 34 to a relatively large diameter about the double pulley shaft 47 while the second pulley portion 58 forces the second belt 36 to a relatively small diameter about the double pulley shaft 47. This is the condition shown in FIG. 4 and FIG. 2. In this condition, the pulley diameter ratios provide that the engine pulley 42 provides the lowest speed to the double pulley 12 while simultaneously, the double pulley 12 provides the lowest speed to the transmission input pulley 20. All such pulley diameter ratios are well known to those skilled in the art and thus further discussion is not necessary. It should be noted, however, that when the middle pulley member 46 slides downward along the double pulley shaft 47, the first pulley portion 56 forces the first belt 34 to a relatively small diameter about the double pulley shaft 47 while the second pulley portion 58 forces the second belt 36 to a relatively large diameter about the double pulley shaft 47. In this condition, shown in FIG. 3, the pulley diameter ratios provide that the engine pulley 42 provides the highest speed to the double pulley 12 while simultaneously, the double pulley 12 provides the highest speed to the transmission input pulley 20. It should also be noted that when the first belt 34 is positioned in the smallest diameter about the double pulley shaft 47, the inside surface of the first belt 34 may contact the outer surface of the double pulley shaft 47. Similarly, as shown in FIG. 4, when the second belt 36 is positioned in the smallest diameter about the double pulley shaft 47, the inside surface of the second belt 36 may contact the outer surface of the double pulley shaft 47. Thus, the double pulley 12 of this invention does not have the collar (not shown) ordinarily provided on double pulleys that limits the travel of a belt toward the double pulley shaft. This provides for a maximum range of pulley diameter ratios (and resultant speeds) given the size of the double pulley 12.

With reference now to FIGS. 2–3, the idler pulley 30 is rotatably connected to an idler pulley bracket 31 that is pivotably connected to the frame 13 at a first end 33. An idler pulley spring 32 biases the idler pulley 30 toward an engaged position (counterclockwise pivot position as viewed in FIGS. 2–3) for the second belt 36. Since both the axis of the double pulley 12 and the axis of the transmission input pulley 20 are fixedly mounted with respect to the frame 13, it should be understood that the idler pulley 30 takes up all the slack in the second belt 36. In fact, the idler pulley 30 assists in taking up any slack in the first belt 34 as well. This is true because tension changes in the first belt 34 are transmitted to the second belt 36 through the double pulley 12. An important aspect of this invention is that the idler pulley 30 is positioned opposite the double pulley 12. In other words, the transmission input pulley 20 is located between the double pulley 12 and the idler pulley 30. This positioning provides advantages for the dynamic drive and brake system 11.

With continuing reference to FIGS. 2–3, one advantage to the positioning of the idler pulley 30 is that the transmission input pulley 20 contacts the second belt 36 at two distinct locations. As commonly known in the art, a driven belt has a tension side and a slack side. The tension side is the portion of the belt that is "upstream" of the drive pulley and therefore is under tension. The slack side is the portion of the belt that is "downstream" of the drive pulley and therefore is not under tension. Preferably, the second belt 36 is driven in a clockwise direction as seen in FIGS. 2–3 by the double pulley 12. Thus, the tension side of the second belt 36 is indicated by reference number 37 and the slack side is indicated by reference number 38. As shown in FIGS. 2–3, the tension side 37 of the second belt 36 is in operative contact with one side of the transmission input pulley 20 and the slack side 38 of the second belt 36 is in operative contact with the other side of the transmission input pulley 20. This double contact of the second belt 36 with the transmission input pulley 20 provides a damper means for vibrations (sometimes referred to as "belt flutter") commonly associated with driven belts as they are driven and adjusted. It should be noted that the double contact of the second belt 36 with the transmission input pulley 20 occurs at all belt positions including at a low speed (FIG. 2) and at a high speed (FIG. 3).

Still referring to FIGS. 2–3, another advantage to the positioning of the idler pulley 30 opposite the double pulley 12 is that the idler pulley 30 can efficiently take up belt slack in the system. When the double idler pulley system 50 is adjusted, the first belt 34 is correspondingly adjusted. This changes the diameter of the first belt 34 at the double pulley 12 and thereby changes the diameter of the second belt 36 at the double pulley 12. The change in the diameter of the second belt 36 changes the tension in the second belt 36. The idler pulley 30 along with the idler spring 32 absorb this change in tension. It is commonly known to use an idler pulley to absorb changing tension in a belt. However, since the idler pulley is typically positioned between a driving pulley (such as double pulley 12 with reference to the second belt 36) and a driven pulley (such as the transmission input pulley 20) all tension must be absorbed on one side (either tension or slack) of the belt. For this invention, on the other hand, the idler pulley 30 is positioned to contact both the tension 37 and slack 38 sides of the second belt 36. For this reason, the idler pulley 30 of this invention must only move about half the distance as compared to an idler pulley positioned only on one side of a belt to absorb the same amount of tension change. This permits the idler spring 32 to be sized with a much lower spring constant than typically required for an idler spring. It should also be understood that this arrangement for the idler pulley 30 provides for very smooth acceleration.

With reference now to FIGS. 2–4, the first and second double idler pulleys 52, 54 of the double idler pulley system 50 are rotatably connected to first and second idler pulley shafts 74, 76 respectively, that are themselves operatively connected to a double idler pulley bracket 78. The idler pulley bracket 78 is pivotably connected to the frame 13 for clockwise and counterclockwise movement as seen in FIGS. 2–3. This permits the double idler pulley system 50 to take up large amounts of loose belt (first belt 34) with relatively small amounts of movement. The double idler pulley system 50 can be positioned as shown in FIG. 2 where the first and second double idler pulleys 52, 54 are approximately side by side along the longitudinal axis of the mower 10. In this condition the first belt 34 is moved to a relatively large diameter at the double pulley 12 as shown in FIG. 4. Alternately, the double idler pulley system 50 can be positioned as shown in FIG. 3 where the first and second double idler pulleys 52, 54 have been pivoted to a position side by side somewhat more perpendicular to the longitudinal axis of the mower 10. In this condition the first belt 34 is moved to a relatively small diameter at the double pulley 12. It should be understood that the double idler pulley system 50 can be selectively adjusted to any position between and including those shown in FIGS. 2 and 3. It should be noted that the double idler pulley system SO contacts the slack side of the first belt 34 and therefore provides an easy and efficient control.

With reference now to FIGS. 1–3, a gear shift 66 is operatively connected to the transmission 18 and is used to adjust the transmission 18 into three alternate conditions —drive, neutral and reverse. These conditions are well known in the art. Preferably, the engaging means 65 includes an accelerator pedal 60. The accelerator pedal 60 is fixedly connected to and selectively rotates an accelerator rod 61 that is operatively connected to the double idler pulley bracket 78 for pivoting motion of the double idler pulley bracket 78. Thus, the accelerator pedal 60 adjusts the double idler pulley system 50 to vary the speed of the mower 10. An accelerator spring 64 biases the acceleration pedal and rod 60, 61 to a zero acceleration or "de-clutched"condition. Therefore, when the accelerator pedal 60 is not depressed, the mower 10 will not move in a forward direction even when the gear shift 66 is in the drive position. A brake pedal 62 selectively stops the mower 10 by any means chosen with sound engineering judgement.

With continuing reference to FIGS. 1–3, the dynamic drive and brake system 11 of this invention indeed provides dynamic drive and braking for the mower 10. By dynamic it is meant that the speed of the mower 10 responds dynamically corresponding to the position of the acceleration pedal 60. The system is dynamic because during normal operation (that is, any time except when the accelerator pedal 60 is fully released and/or the brake pedal 62 is depressed) the idler pulley 30 maintains both the first and second belts 34, 36 in continuous engagement. When the acceleration pedal 60 is depressed in a forward direction (toward the engine 40 and engine pulley 42) the mower 10 accelerates. When the acceleration pedal 60 is released (the accelerator spring 64 biases the acceleration pedal 60 in a backward direction toward the operator seat 14 and the back drive axle 28) the mower 10 decelerates. It should be noted that this deceleration occurs even when the mower 10 is moving downhill. Thus, the acceleration pedal 60 and the brake pedal 62 of the mower 10 are similar to an automobile having an automatic transmission. Therefore the dynamic drive and brake system 11 of this invention provides intuitive controls for nearly all drivers.

Still referring to FIGS. 1–3, another advantage to the dynamic drive and rake system 11 of this invention is that the riding mower can only be started at the very lowest speed. This is true because the ignition system (not shown) will not permit start up of the engine 40 unless the accelerator pedal 60 is fully released.

Then to accelerate the mower 10, the accelerator pedal 60 can be depressed starting at the lowest possible speed.

With reference to FIGS. 1–4, the operation of the dynamic drive and brake system 11 will now be described. To accelerate the mower 10 in a forward direction, the operator starts the engine 40 and places the gear shift 66 into the drive position. Next, the operator depresses the acceleration pedal 60, overcoming the biasing force of the acceleration spring 64. This causes the double idler pulley system 50 to pivot (counterclockwise as shown in FIGS. 2–3) from an inoperative or de-clutched condition to an operative condition. In other words, the first and second double idler pulleys 52, 54 properly engage the first belt 34 to the engine pulley 42 and the double pulley 12. The farther the accelerator pedal 60 is depressed, the more the double idler pulley system 50 pivots and, correspondingly, the more tension is applied to the first belt 34. The increased tension in the first belt 34 causes the middle pulley member 46 to move in a downward direction (as shown in FIG. 4) and therefore decreases the diameter of the first belt 34 about the double pulley shaft 47. The movement of the middle pulley member 46 simultaneously increases the diameter of the second belt 36 about the double pulley shaft 47. This increases the tension in the second belt 36 which tension is absorbed by the idler spring 32 that permits the idler pulley 30 to pivot in a clockwise direction as seen in FIGS. 2–3. The particular diameters of the first and second belts 34, 36 about the double pulley 12 provide increased rotational speed to the transmission input pulley 20. This increased rotational speed is then transferred to the transmission 18 and on to the back drive axle 28 and back wheels 24 for corresponding acceleration of the mower 10.

With continuing reference to FIGS. 1–4, to decelerate the mower 10, the operator partially (or fully depending on the amount of deceleration desired) releases the acceleration pedal 60 thereby permitting the biasing force of the acceleration spring 64 to move the acceleration pedal and rod 60, 61. This causes the double idler pulley system 50 to pivot in a clockwise direction as shown in FIGS. 2–3. This decreases the tension in the first belt 34. The decreased tension in the first belt 34 causes the middle pulley member 46 to move in a upward direction (as shown in FIG. 4) and therefore increases the diameter of the first belt 34 about the double pulley shaft 47. The movement of the middle pulley member 46 simultaneously decreases the diameter of the second belt 36 about the double pulley shaft 47 decreasing the tension in the second belt 36. This decrease in the tension of the second belt 36 tends to create "slack"in the second belt 36. This slack is removed by the idler spring 32 that biases the idler pulley 30 to pivot in a counterclockwise direction as seen in FIGS. 2–3. The particular diameters of the first and second belts 34, 36 about the double pulley 12 provide decreased rotational speed to the transmission input pulley 20. This decreased rotational speed is then transferred to the transmission 18 and on to the back drive axle 28 and back wheels 24 for corresponding deceleration of the mower 10.

Figure 5:
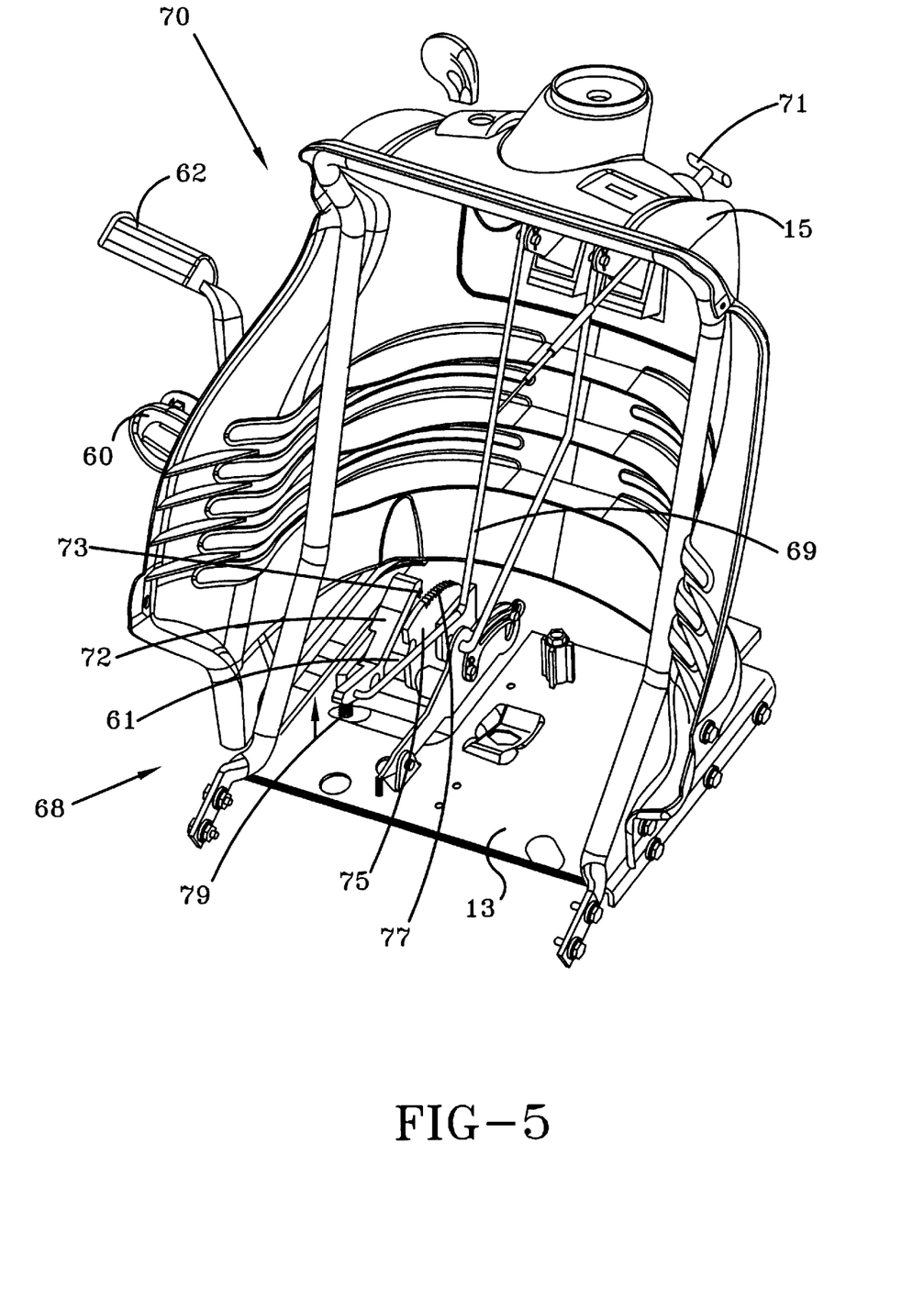
FIG. 5 is perspective view of the inside of the dash showing the cruise control system of this invention.

With reference now to FIGS. 1–3 and 5, the cruise control system 70 will now be described. The cruise control system 70 is used to mechanically lock the accelerator pedal 60 in place. This permits the operator to release all pressure from the accelerator pedal 60 (resting the foot of the operator) while maintaining the accelerator pedal 60 in any predetermined position. In this way the mower 10 maintains substantially the same speed without constant input from the operator. The cruise control system 70 utilizes a rack and pinion type of interconnection. A cruise cam 72 having cruise teeth 73 is pivotably attached to the frame 13 within the dash 15. A rack member 75 fixedly attached to the accelerator rod 61 has rack teeth 77 that may receive the cruise teeth 73. Biasing means that is preferably a cruise spring 79 biases the cruise cam 72 out of engagement with the rack member 75 (counterclockwise as seen in FIG. 5). Mechanical engaging means 68 is provided to mechanically engage the cruise teeth 73 to the rack teeth 77. The mechanical engaging means 68 may be of any type chosen with sound engineering judgement. In the preferred embodiment, the mechanical engaging means 68 includes a cruise lever 71. The cruise lever 71 extends from outside the dash 15 where the operator may move it, through the dash 15 where it is pivotably connected to an extension arm 69. One end of the extension arm 69 is pivotably connected to the cruise cam 72.

With continuing reference to FIGS. 1–3 and 5, to operate the cruise control system 70, the operator first depresses the accelerator pedal 60 to the desired speed and then pushes the cruise lever 71 toward the dash 15. The motion of the accelerator pedal 60 rotates the accelerator rod 61 and the rack member 75 accordingly. The motion of the cruise lever 71 causes the extension arm 69 to overcome the biasing force of the cruise spring 79 and thus pivot the cruise cam 72 toward the rack member 75. As this occurs, the cruise teeth 73 on the cruise cam 72 engage the rack teeth 77 on the rack member 75. This engagement of teeth locks the rack member 75 and thus the accelerator rod 61 (and accelerator spring 64) in place. In this way the speed of the mower 10 is maintained at a constant speed without the operator needing to contribute any forces to the accelerator pedal 60.

Still referring to FIGS. 1–3 and 5, there are two ways to disengage the cruise control system 70. By disengage the control system it is meant to disengage the cruise teeth 73 on the cruise cam 72 from the rack teeth 77 on the rack member 75. This disengagement returns the accelerator pedal 60 and accelerator rod 61 to the full control of the operator as before the cruise control system 70 was engaged. The cruise control system 70 can be disengaged by depressing the accelerator pedal 60. This causes the accelerator rod 61 and the rack member 75 to rotate thereby permitting the cruise teeth 73 to come enough out of physical contact with the rack teeth 77 to allow the cruise spring 79 to bias the cruise cam 72 away from the rack member 75. The second way to disengage the cruise control system 70 is by depressing the brake pedal 62. This causes the brake rod 67 (seen in FIGS. 2 and 3) that is fixedly attached to the brake pedal 62 to rotate. Fixedly attached to the brake rod 67 juxtaposed to the cruise cam 72 is a release member 63. When the brake rod 67 is depressed, the brake rod 67 rotates causing the release member 63 to contact the cruise cam 72 and pivot the cruise cam 72 out of engagement with the rack member 75.

The invention has been described with reference to preferred embodiments. Obviously, modifications and alterations will occur to others upon a reading and understanding of this specification. It is intended to include all such modifications and alternations in so far as they come within the scope of the appended claims or the equivalence thereof.

Having thus described the invention, it is now claimed:

1. A mower comprising:

a frame;

a plurality of wheels including at least a first drive wheel operatively supported by said frame;

an engine operatively mounted to said frame;

a mower deck operatively connected to said frame;

a drive system for use in transferring power from said engine to said at least first drive wheel, said drive system including an accelerator pedal fixedly connected to an accelerator rod; and, a cruise control system that mechanically locks the accelerator pedal and accelerator rod in place, said cruise control system including:

A. a rack member fixedly attached to said accelerator rod and having rack teeth;

B. a cruise cam pivotably attached to said frame and having cruise teeth; and,

C. mechanical engaging means for mechanically engaging said cruise teeth to said rack teeth, wherein when said cruise teeth engage said rack teeth, said cruise teeth mechanically lock said rack teeth in place thereby locking said accelerator pedal and said accelerator rod in place.

2. The mower of claim 1 wherein said mechanical engaging means comprises:

a cruise lever that is selectively adjustable by an associated operator; and, an extension arm pivotably connected to said cruise lever and a having an end pivotably connected to said cruise cam.

3. The mower of claim 2 further comprising:

biasing means for biasing said cruise cam out of engagement with said rack member.

4. A method for operating a cruise control comprising the steps of:

providing a mower that includes a frame, a plurality of wheels including at least a first drive wheel operatively supported by said frame, an engine operatively mounted to said frame, a mower deck operatively connected to said frame, and a drive system for use in transferring power from said engine to said at least first drive wheel, said drive system including an accelerator pedal fixedly connected to an accelerator rod;

providing a cruise control system that includes a rack member fixedly attached to said accelerator rod and having rack teeth and a cruise cam pivotably attached to said frame and having cruise teeth; and, engaging said cruise teeth to said rack teeth to mechanically lock said rack teeth in place thereby locking said accelerator pedal and said accelerator rod in place.

5. The method of claim 4 further comprising the steps of:

providing said cruise control system with a cruise lever and an extension arm that is pivotably connected to said cruise lever and a having an end pivotably connected to said cruise cam;

said step of engaging said cruise teeth to said rack teeth comprising the steps of depressing said accelerator pedal corresponding to the desired speed, pushing said cruise lever, moving said extension arm, and pivoting said cruise cam toward said rack member.

6. A method for disengaging a cruise control system comprising the steps of:

providing a mower that includes a frame, a plurality of wheels including at least a first drive wheel operatively supported by said frame, an engine operatively mounted to said frame, a mower deck operatively connected to said frame, and a drive system for use in transferring power from said engine to said at least first drive wheel, said drive system including an accelerator pedal fixedly connected to an accelerator rod;

providing a cruise control system that includes a rack member fixedly attached to said accelerator rod and having rack teeth and a cruise cam pivotably attached to said frame and having cruise teeth;

depressing said accelerator pedal;

rotating said rack member; and, disengaging said cruise teeth from said rack teeth to disengage the mechanical lock on said accelerator pedal and said accelerator rod.

7. A method for disengaging a cruise control system comprising the steps of:

providing a mower that includes a frame, a plurality of wheels including at least a first drive wheel operatively supported by said frame, an engine operatively mounted to said frame, a mower deck operatively connected to said frame, and a drive system for use in transferring power from said engine to said at least first drive wheel, said drive system including a brake pedal and a release member fixedly connected to a brake rod;

providing a cruise control system that includes a rack member fixedly attached to said accelerator rod and having rack teeth, a cruise cam pivotably attached to said frame and having cruise teeth, a cruise lever, and an extension arm pivotably connected to said cruise lever and a having an end pivotably connected to said cruise cam;

depressing said brake pedal;

rotating said brake rod;

contacting said cruise cam with said release member; and, pivoting said cruise cam out of engagement with said rack member to disengage the mechanical lock on said accelerator pedal and said accelerator rod.

* * * * *